United States Patent [19]
Schotten et al.

[11] 3,981,802
[45] Sept. 21, 1976

[54] PLATE TYPE PRESS FILTER

[75] Inventors: Alfons Schotten, Duren; Hermann Josef Spölgen, D'horn; Ulrich Rilling, Stolberg, all of Germany

[73] Assignee: Eberhard Hoesch & Sohne, Duren, Germany

[22] Filed: Mar. 26, 1975

[21] Appl. No.: 562,161

[30] Foreign Application Priority Data
Mar. 30, 1974   Germany.......................... 2415598

[52] U.S. Cl. ................................. 210/91; 100/50; 210/227; 210/230; 210/231; 210/236
[51] Int. Cl.² ........................................ B01D 25/12
[58] Field of Search ................ 100/48, 50; 210/91, 210/137, 148, 224, 225, 227, 228, 229, 230, 231, 236

[56] References Cited
UNITED STATES PATENTS

| | | | |
|---|---|---|---|
| 2,293,815 | 8/1942 | Gates................................ | 100/48 X |
| 2,790,204 | 4/1957 | Edwards et al. .................. | 100/50 X |
| 3,342,123 | 9/1967 | Ermankov et al. ............. | 210/225 X |
| 3,583,566 | 6/1971 | Sumskaya et al............... | 210/230 X |

FOREIGN PATENTS OR APPLICATIONS

| | | | |
|---|---|---|---|
| 47-33103 | 4/1970 | Japan.................................. | 210/231 |
| 46-26850 | 8/1966 | Japan.................................. | 100/48 |
| 118,023 | 7/1958 | U.S.S.R............................... | 100/50 |

*Primary Examiner*—Charles N. Hart
*Assistant Examiner*—Robert G. Mukai
*Attorney, Agent, or Firm*—Spencer & Kaye

[57] ABSTRACT

A filter press has a support frame; a plurality of face-to-face oriented filter plates movable towards and away from one another and forming a filter plate stack; a closing device connected to the filter plates for exerting thereon a pressure with which the filter plates are urged to one another; a closing pressure regulator coupled to the closing device; a stationarily supported path-sensing signal transmitter connected to the closing device; and a sensor arm connected at least indirectly to one of the filter plates for displacing the sensor arm by, and as a function of the motion of, that filter plate. The sensor arm is coupled to the path-sensing signal transmitter for controlling the closing pressure of the closing device by the signal transmitter as a function of the position of the sensor arm.

13 Claims, 3 Drawing Figures

PLATE TYPE PRESS FILTER

BACKGROUND OF THE INVENTION

This invention relates to a plate type press filter, particularly of the type which has horizontally superimposed, movable filter plates between which there is disposed an endless, movable filter cloth which is deflected by deflecting rolls and which passes through a driving station. The press filter further includes a preferably hydraulic closing device which affects the filter plates and which is connected to a closing pressure regulator.

Plate type press filters having vertically oriented filter plates are disclosed, for example, in German Pat. No. 1,138,739, while plate type press filters having horizontally oriented filter plates are disclosed, for example, in German Pat. No. 1,461,500. Up till now, in such filters it was sufficient to maintain the plate stack in a closed position with a predetermined pressure which has been of such a magnitude that it takes up the inner press pressure during the filtering process and effects a sufficient seal between the individual filter plates. With increasing structural dimensions and in large-output filters utilizing high pressure, particularly, however, in plate type press filters of the above-outlined type, the sealing faces are, in such a mode of operation, exposed to such a stress that they are destroyed after a short operational period if the closing pressure for moving to one another the filter plates of the stack is designed to equal the inner filter pressure, although such an inner pressure is not yet present. In plate type press filters of the above-outlined type there are further experienced difficulties in the advance of the filter cloth in case more than 20 filter plates are present, because with the growing number of deflecting rollers and the contacting surfaces between the filter cloth and the filter plates, the frictional forces to be overcome attain such a high value that the filter cloth will be overloaded in the zone of the drive station.

SUMMARY OF THE INVENTION

It is an object of the invention to provide a plate type press filter of the above-outlined type from which the discussed disadvantages are eliminated.

This object and others to become apparent as the specification progresses, are accomplished by the invention, according to which, briefly stated, for the actuation of the closing pressure regulator there is provided at least one path-sensing signal transmitter which is preferably mounted on a stationary frame portion. Further, there is provided a sensor arm which cooperates with the signal transmitter and which is supported in the zone of a filter plate, particularly in the zone of the first filter plate which is connected with the filter plate closing device.

With the aid of the arrangement outlined above, it is possible to effect a closing movement of the filter plates with a predetermined closing pressure which lies below the operational pressure and which effects a predetermined deformation of the sealing edges extending perimetrically on the filter plates. The predetermined deformation is coordinated with the desired sealing effect. In this manner, there is accomplished a tight (sealed) closing of the entire filter plate stack. With the aid of the path-sensing signal transmitter it is thus possible to increase or decrease the work pressure of the closing device upon an increase of the inner pressure which tends to move the filter plates in the opening direction or upon a decrease of the inner pressure which, in turn, tends to cause movement of the filter plates in the closing direction. In this manner it is possible to maintain the deformation of the sealing elements of the individual filter plates within predetermined limits and thus increase the operability and the life span of the entire assembly. The invention may find particularly advantageous application in hydraulically operated closing devices; it can be used, however in a simple manner, in mechanically, particularly electromechanically operated closing devices as well.

According to a feature of the invention, the signal transmitter is affixed to the frame in a position which corresponds approximately to the position of the first filter plate in the closed state of the filter. By this arrangement it is achieved that subsequent to previous adjustment of the sensor arm in the closed position, all sealing elements of the filter plate stack are in tight engagement and further, undesirable occurrences caused by different deformations between filter plates are excluded. In this connection, it is particularly advantageous to arrange the sensor arm at the location of connection of the first filter plate with the closing device.

According to a further feature of the invention, the signal transmitter has, with respect to the path length to be sensed, at least three stepped switching positions, wherein the middle switching position determines the normal position of the closing device, while the last switching position (with respect to the closing direction) actuates the after-connected switching and control devices of the closing device in the opening direction. The first switching position, on the other hand, actuates the after-connected switching and control devices in the closing sense. This arrangement which operates in the manner of a two-point regulation, affords a particularly advantageous and simple possibility for operating the closing device, particularly a hydraulically operated closing device.

In accordance with a further feature of the invention, with the sensor arm there are connected three sensor plates which are juxtapositioned in the same height with respect to the closing direction and which are preferably yielding in the direction of motion. The sensor plates are associated with three inductive or capacitive signal transmitter elements which are situated besides one another and at stepped height with respect to the closing direction. With the aid of signal transmitters of this type which are preferably disposed at identical switching distance, the switching and control devices of the closing device may be controlled in a simple manner. The preferred yielding support of the sensor plates makes possible an exact setting of the switching distance and further makes possible to support the sensor plates in a common element which is actuated by the sensor arm. In this connection, it is a further feature of the invention to support the sensor plates on a plunger which can be actuated by the sensor arm in the closing direction against the force of a return spring. With this arrangement it is achieved that upon opening of the filter press, the sensor plates are automatically returned to their initial position.

In order to automatically compensate for wears and manufacturing inaccuracies which manifest themselves only during operation and thus to avoid a frequent readjustment of the sensor plates with respect to their initial position, it is particularly advantageous to support the sensor arm to be slidable in the closing direction and to connect it to the frame by means of a setting mechanism, preferably, by means of a hydraulic cylinder. In this manner, it is possible to close the filter press to an extent until a given filter plate has reached its normal position and subsequently, to bring the sensor arm by means of the setting device into a position associated with the normal position. It is thus possible to adapt the sensor arm at different positions of the first filter plate with respect to the signal transmitter without overloading the sealing elements.

It is particualrly advantageous to connect the setting device with a pressure sensor which, upon reaching of a predetermined closing pressure of the plate type press filter, moves the sensor arm towards the signal transmitter up to the middle switching position (normal position).

This arrangement may find particularly advantageous application in plate type press filters having hydraulically operating closing devices, since in such cases the pressure sensor cooperates with a biasing valve which is disposed in the hydraulic circuit of the closing device and thus, upon reaching the predetermined closing pressure for the plate type pressure filter, is opened and moves the sensor arm up to the normal position of the signal transmitter. In this manner, then, the fluid admission to the hydraulic closing device is automatically shut off and the plate type pressure filter is maintained at the predetermined closing pressure.

According to another feature of the invention at least one filter cloth deflecting roller disposed in the middle zone of the filter plate stack is connected with a drive motor and constitutes an additional driving station for facilitating the filter cloth advance. In this manner, particularly in case of a large number of filter plates, a filter cloth transport may be effected without overloading the filter cloth in the direction of advance. In this connection it is still another feature of the invention to provide a hydraulic motor as the drive motor and to connect it in series with the motor of the driving station, which last-named motor is designed, in a known manner, as a hydraulic motor.

DESCRIPTION OF THE PREFERRED EMBODIMENTS

Figure 1:
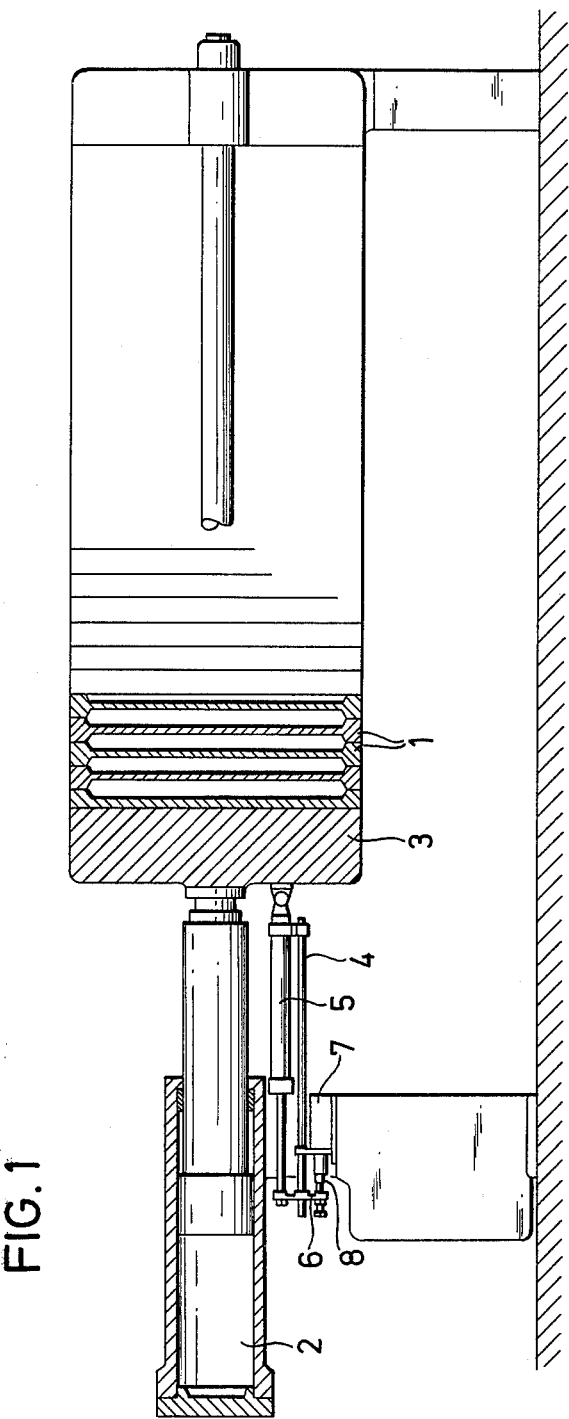
FIG. 1 is a sectional side elevational view of a plate type press filter with vertically oriented, horizontally justapositioned filter plates (chamber or frame filter press).

In the embodiment according to FIG. 1, there are provided filter plates 1 which are vertically oriented and which are horizontally juxtapostioned and which further are connected with a closing device 2 formed as a hydraulic cylinder. Expediently, the filter plate 1 which is the closest to the closing device 2 (that is, the leftmost filter plate 1 in FIG. 1) is fixedly attached to a pressure plate 3 which forms part of the closing device 2. The filter plates, with the aid of a non-illustrated transporting mechanism, can be moved in a horizontal plane into an open position towards the left and into a closed position towards the right on guide means (also not shown) provided in the machine frame.

With the aid of the closing device 2 the filter plates moved towards one another into the closed position are first pressed together by means of a predetermined closing pressure so that the filter chambers between the individual filter plates can be charged with the liquid to be filtered.

According to the invention, on the pressure plate 3 of the closing device there is arranged, with one end, a hydraulic cylinder 5 which carries a guide 4 and to the other end of which there is secured a sensor arm 6. On the machine frame there is further mounted a path-sensing signal transmitter 7, the plunger 8 of which is oriented towards the sensor arm 6. To commence operation of the filter press, the filter plates, which were moved together into the closed position, are first pressed together by means of the closing device at a predetermed closing pressure. At the same time, the plunger of the path-sensing signal transmitter is brought by the sensor arm into its normal position and, by means of the signal transmitter, the fluid admission to the closing cylinder or, as the case may be, the control of the closing device in case of a mechanically operated closing device is shut off, so that there is obtained a constant closing pressure and thus a constant deformation of the sealing elements. If now the liquid to be filtered is admitted to the filter, the inner pressure is built up which works against the closing pressure and seeks to open (move apart) the filter plates of the filter plate stack. As a result, the filter plates are, corresponding to the increase of the inner pressure, somewhat moved apart so that now by means of the path-sensing signal transmitter, a fluid flow to the closing cylinder is effected and the closing pressure is continuously increased as long as the terminal piece is again brought into its normal position and, accordingly, the sensor arm also assumes its normal position whereby the fluid flow to the cylinder is again shut off. Thus, the original pressure force between the individual sealing elements is re-established and a sealing of the entire filter plate stack is effected.

Upon completion of the filtering process which results in a slow decrease of the inner pressure, the filter plates are compressed further because of the now relatively increased closing pressure. By means of the path-sensing signal transmitter such a compression which exceeds the normal position, is sensed and automatically the hydraulic pressure of the closing device is decreased to such an extent until the filter plate stack again assumes its normal position. Now the washing steps may take place during the course of which the above-described regulation will take place in accordance with the changes of the inner pressure. Thereafter, the signal transmitter is deenergized and the filter press is opened to eject the filter cake. Further, rinsing steps to clean the filter cloth may also take place and thereafter the filter press is again placed into its standby state.

Figure 2:
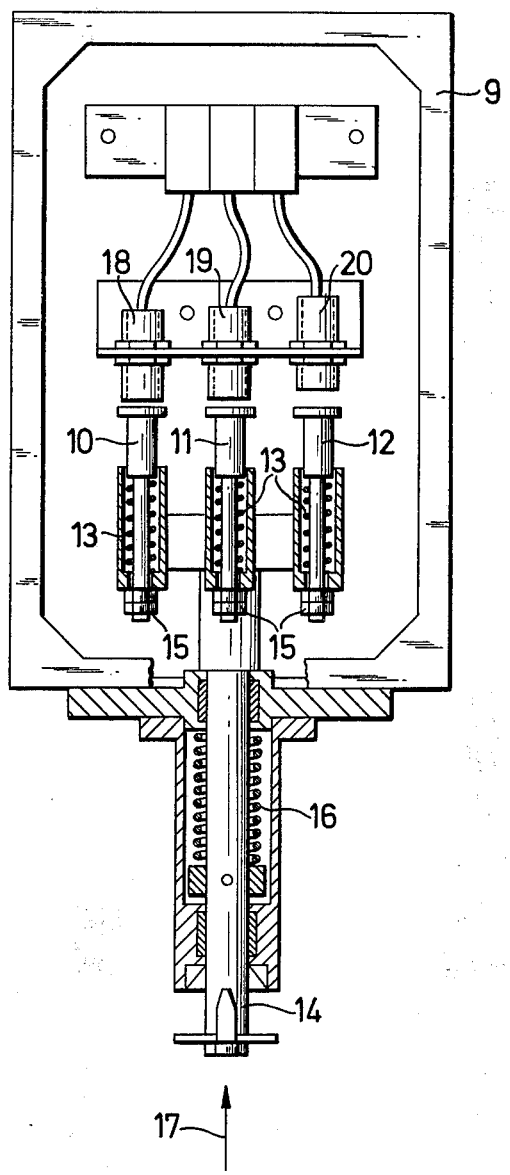
FIG. 2 is a longitudinal sectional view of a preferred embodiment of a path-sensing signal transmitter according to the invention.

In FIG. 2 there is shown a preferred embodiment of a path-sensing signal transmitter, the mode of operation of which was described above. In a housing 9 there are yeildingly supported on a guided plunger 14, three sensor plates 10, 11 and 12 by means of compression springs 13. Set screws 15 are provided for accurately adjusting the sensor plates. The plunger 14 is longitudinally displaceably supported in the housing 9 and, with the aid of a spring 16 is maintained in its initial position.

Thus, the sensor plates 10, 11 and 12 may move in the direction of the associated respective signal transmitter elements 18, 19 and 20 only as result of a shift of the sensor arm (not shown in FIG. 2) in the direction of arrow 17. The signal transmitter elements 18, 19 and 20 are arranged in a stepped manner with respect to the direction of motion of the guided plunger 14, so that first the sensor plate 10 reaches the signal transmitter elements 18, then the sensor plate 11 contacts the signal transmitter element 19 and finally the sensor plate 12 contacts the signal transmitter element 20. The signal transmitter element 19 is adjusted with its associated sensor plate in such a manner that the switching distance for which the signal transmitter element is desinged is reached when the filter plate stack is in its normal position, that is, it is exposed to the minimum closing pressure. Upon a further motion in the direction of arrow 17, the signal transmitter element 20 is activated, the switching pulse of which, for example, in a hydraulically operated closing device, maintains open a valve in the hydraulic system until the normal position is reestablished. If, on the other hand, by means of a higher inner pressure the guided plunger 14 is moved in a direction opposite to arrow 17 which means that the filter plate stack is exposed to a correspondingly higher inner pressure in the opening direction, the signal transmitter element 18 is activated and as a result, the closing device is supplied with hydraulic fluid until the normal position is reestablished.

Figure 3:
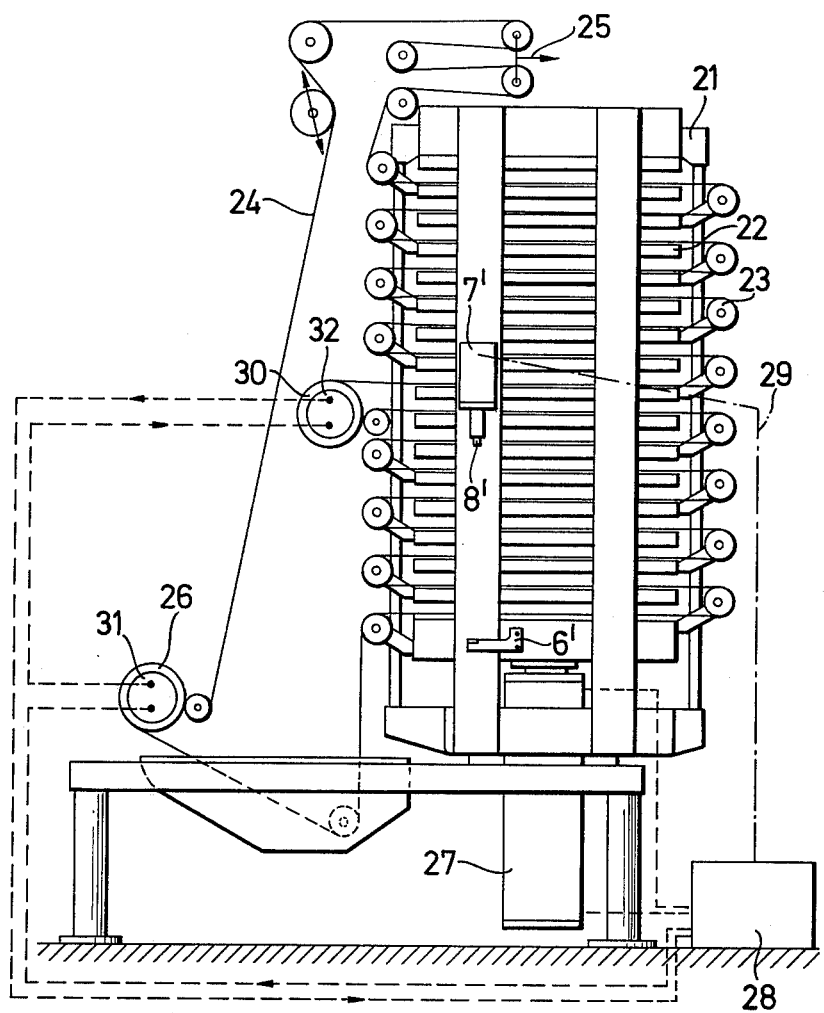
FIG. 3 is a side elevational view of a plate type press filter with horizontally oriented, vertically superimposed filter plates.

In FIG. 3 there is illustrated, as a further embodiment, a tiered pressure filter having horizontally oriented vertically superimposed filter plates. In this arrangement, in a machine frame 21, a plurality of superimposed filter plates 22 are guided. Each filter plate has, alternatingly, at the one and the other end, a deflecting roller 23 about which there is trained an endless filter cloth 24. At the upper end of the filter assembly there is disposed a schematically illustrated tensioning station 25 for the filter cloth and in the lower zone there is disposed a driving station 26. Beneath the filter plates there is positioned a closing device, in this embodiment a hydraulic closing device 27, with the aid of which the filter plate stack may be compressed in a vertical direction.

On the machine frame there is mounted a path-sensing signal transmitter 7' which cooperates, by means of a guided plunger 8', with a sensor arm 6' which is mounted on the lowest filter plate.

By means of the hydraulic fluid supply device 28, the filter plates are moved towards one another from the open position shown in FIG. 3 until they assume their normal position as determined by the signal transmitter 7'. Dependent upon an increase or drop in the inner filter pressure, the closing device 27 is actuated in the closing direction or in the opening direction by means of the signal transmitter 7', the contact conduit 29 of which is in communication with the hydraulic fluid supply device 28. Thus, during the course of the entire filter process, the normal position of the filter plates is maintained.

Upon completion of the filter process, the filter plates are opened by virtue of lowering the closing device. By means of the driving device 26 the filter cloth is now pulled through, so that the filter cake adhering thereto is ejected in each tier in the zone of the deflecting rollers 23 into a collecting means not shown. In particularly large-dimension filter units having 20 or more filter plates, the frictional resistance for the motion of the endless filter cloth is so large that the load on the filter cloth will become excessive. Therefore, according to the invention, one of the deflecting rollers, preferably one which is disposed in the middle range of the assembly, is designed as an additional drive 30. It is expedient to design the drive motors of both drive mechanisms 26 and 30 as identical hydraulic motors 31 and 32, respectively, and to arrange them in series, one behind the other with respect to the hydraulic pressure supply means 28, whereby a synchronous operation of the two drive stations is achieved.

It is to be understood that the invention is not limited to the path-sensing signal transmitter set forth in the specification; it is feasible to use path-sensing signal transmitters of different structure which, for example, operate, inductively, or pneumatically; or, path-dependent switches, such as three-point switches may be used.

It will be understood that the above description of the present invention is susceptible to various modifications, changes and adaptations, and the same are intended to be comprehended within the meaning and range of equivalents of the appended claims.

What is claimed is:

1. In a filter press having a support frame; a plurality of face-to-face oriented filter plates forming a filter plate stack; means for movably supporting the filter plates with respect to one another; a closing device connected to the filter plates for exerting thereon a pressure with which the filter plates are urged to one another; and a closing pressure regulator coupled to the closing device; the improvement comprising:
    a. a stationarily supported path-sensing signal transmitter means operatively connected to said closing pressure regulator; and
    b. a sensor arm attached at least indirectly to one of said filter plates for displacing said sensor arm by, and as a function of, the motion of, said one filter plate; said sensor arm being operatively coupled to said path-sensing signal transmitter means for controlling the closing pressure of said closing device by said signal transmitter means as a function of the position of said sensor arm.

2. A filter press as defined in claim 1, said sensor arm being affixed to the filter plate closest to said closing device.

3. A filter press as defined in claim 2, wherein the filter plate closest to said closing device is fixedly attached thereto.

4. A filter press as defined in claim 1, wherein said signal transmitter means is affixed to said support frame approximately at the location where the first filter plate of the filter plate stack dwells in the closed state of the filter press.

5. A filter press as defined in claim 1, wherein said signal transmitter means includes at least three switch devices staggered with respect to one another, each switch device being actuated in different positions of said sensor arm; a first one of said switch devices determining the normal position of said closing device; a second one of said switch devices effecting, upon actuation, a control of said closing device in the opening direction and a third one of said switch device effecting, upon actuation, a control of said closing device in the closing direction.

6. A filter press as defined in claim 1, wherein said signal transmitter means includes:

a. three juxtapositioned sensor plates situated at identical heights with respect to the closing direction of the filter press, said sensor plates being within the operative range of said sensor arm and are displaceable by the latter; and b. three signal transmitter elements, each disposed in the path of motion of a separate one of said sensor plates; said signal transmitter elements being staggered with respect to one another in said closing direction; each said signal transmitter element being actuated by its associated sensor plate when the latter assumes a predetermined position as a function of the position of said sensor arm.

7. A filter press as defined in claim 6, wherein said signal transmitting elements are capacitive.

8. A filter press as defined in claim 6, wherein said signal transmitting elements are inductive.

9. A filter press as defined in claim 6, further including means for supporting said sensor plates to be yielding in their direction of displacement.

10. A filter press as defined in claim 6, further including a plunger supported for sliding motion, said plunger being situated in the path of motion of said sensor arm to be displaced by the latter in said closing direction; said sensor plates being supported and movable by said plunger; and a spring urging said plunger in a direction opposing said closing direction.

11. A filter press as defined in claim 1, further including means for displaceably supporting said sensor arm in the closing direction of said filter press; and a setting drive coupled to said closing device and said sensor arm.

12. A filter press as defined in claim 11, wherein said setting drive is a hydraulic cylinder.

13. A filter press as defined in claim 11, further including a pressure sensor connected to said setting drive and said closing device for moving said sensor arm towards said signal transmitter into a normal, neutral position when said closing device exerts a predtermined closing pressure on said filter press.

* * * * *